(12) United States Patent
Chang

(10) Patent No.: US 6,831,837 B2
(45) Date of Patent: Dec. 14, 2004

(54) EXTERNAL CONTROLLER OF BURNING RECORD FOR COMPACT DISKS

(76) Inventor: Cheng-Chun Chang, 11F-2, No. 11, Lane 202, Jing-Shing Road, Wen-Shan DT, Taipei (TW)

( * ) Notice: Subject to any disclaimer, the term of this patent is extended or adjusted under 35 U.S.C. 154(b) by 866 days.

(21) Appl. No.: 09/794,352

(22) Filed: Feb. 28, 2001

(65) Prior Publication Data

US 2002/0120877 A1 Aug. 29, 2002

(30) Foreign Application Priority Data

Feb. 7, 2001 (TW) .................................... 90201833 U

(51) Int. Cl.$^7$ ............................................. H05K 7/20
(52) U.S. Cl. .................... 361/715; 361/683; 361/685; 361/686; 206/307; 206/308; 710/62; 710/72
(58) Field of Search ............................ 361/715, 686, 361/685, 788, 683; 713/150; 710/1, 62, 72, 74; 206/307, 308

(56) References Cited

U.S. PATENT DOCUMENTS 6,510,051 B2 * 1/2003 Kim ............................ 361/686
6,560,099 B1 * 5/2003 Chang ......................... 361/685

* cited by examiner

Primary Examiner—Kamand Cuneo
Assistant Examiner—Hung S. Bui
(74) Attorney, Agent, or Firm—Troxell Law Office PLLC

(57) ABSTRACT

An external controller of burning record for compact disks comprises a control box and a circuit board. The control box has the front panel thereof extending two pivotal connectors to join two docking boxes containing a data record loader and a compact disk burning record device respectively. The rear side of the control box provides a power supply to obtain the direct current with stabilized voltage. A control switch for powering on or off and for starting or shutting off the burning operation is also provided on the rear side of control box. The circuit board is received in the control box and receives the direct current with stabilized voltage. There are related wires on the circuit board to connect with the preceding components. A control chip is on the circuit board to contain a recording firmware and to offer the compact disk burning record device a recording program so as to execute related steps of burning record. Once the control switch button is pressed down to power on the power source, the operation of burning record can be processed smoothly.

16 Claims, 4 Drawing Sheets

EXTERNAL CONTROLLER OF BURNING RECORD FOR COMPACT DISKS

BACKGROUND OF THE INVENTION

1. Field of the Invention

The present invention relates to an external controller of burning record for compact disks, and particularly to a controller of burning record, which externally connects with a docking box containing a data record loader and at least a docking box containing a compact disk burning record device respectively.

2. Description of Related Art

The computer is popularly used in our daily life and brings us a great convenience. The traditional slow manual works such as mathematical operations, file management, data storage and search, can be done by the computer efficiently. Hence, the rise of computer basically can be classified as another industrial revolution.

However, the problem with regard to the backup of data keeps bothering the users along with the wider application of computer. Therefore, the so-called compact disk burning record device (CD-R, CD-RW, or DVD-R) was developed for the need of backup of data, making a test disk, or making a mother disk and has become one of periphery devices for the computer.

Generally, there are three different ways of compact disk burning record. One of these three different ways is built-in type and the compact disk burning record device is mounted in the main unit of desk computer. Because the built-in type is not related to the technical scope of present invention, no detail will be described further here. The second way is external type and it is used in case of a desk computer with insufficient extending space or a notebook computer without enough space for being built in a compact disk recording device. The external type usually has a docking box, in which the compact disk burning record device is received, to connect with the computer for performing the operation of burning record. The third way is a type of mutual copying. That is, a read only compact disk drive and a compact disk burning record device are mounted in a casing with a single power supply. A circuit board in the casing provides a control chip, a read only memory (ROM) with firmware for recording, and a plurality of light emitting diodes for signaling the operation of recording.

But, the type of mutual copying for the compact disk recording device is huge in size unfavorable for carrying about and is expensive. Moreover, the read only compact disk drive is not possible to be separated from the compact disk burning record device so that both of them are unable to be integrated with a computer as an individual part of periphery thereof. In this way, the read only compact disk drive and the compact disk burning record device are idle in case of no mutual copying being executed. In addition, the data record loader provided in the compact disk burning record device of the type of mutual copying has to be the read only compact disk drive. Other device such as hard disk drive, ZIP drive, magneto-optical disk driver, LS-120 floppy disk drive, magnetic tape driver, or card read can not be used instead so that a less practicality can be reached.

SUMMARY OF THE INVENTION

An object of present invention is to provide an external controller of burning record for compact disks, which connects with docking boxes containing a data record loader and a compact disk recording device respectively to obtain functions such as backing up data, and making a test disk and a mother disk.

Another object of present invention is to provide an external controller of burning record for compact disks, in which at least a selective switch on a control box is operated to control options such as connecting other compact disk recording device, and recording instructions including the speed of recording, simulation, recording directly, and data comparison.

A still further object of present invention is to provide an external controller of burning record for compact disks, in which at least a cable connector on the control box connects with two or more compact disk burning record devices to achieve a purpose of recording multiple compact disks.

A further object of present invention is to provide an external controller of burning record for compact disks, in which a signal connector on a control box connects with a computer via a signal line so as to perform data read and/or write of read only compact disk drive and/or the compact disk burning record device connecting with the controller.

A further object of present invention is to provide an external controller of burning record for compact disks, in which a displaying device on a control box can show the instant state of recording.

BRIEF DESCRIPTION OF THE DRAWINGS

The present invention can be more fully understood by referring to the following description and accompanying drawings, in which.

DETAILED DESCRIPTION OF THE PREFERRED EMBODIMENTS

Figure 1:
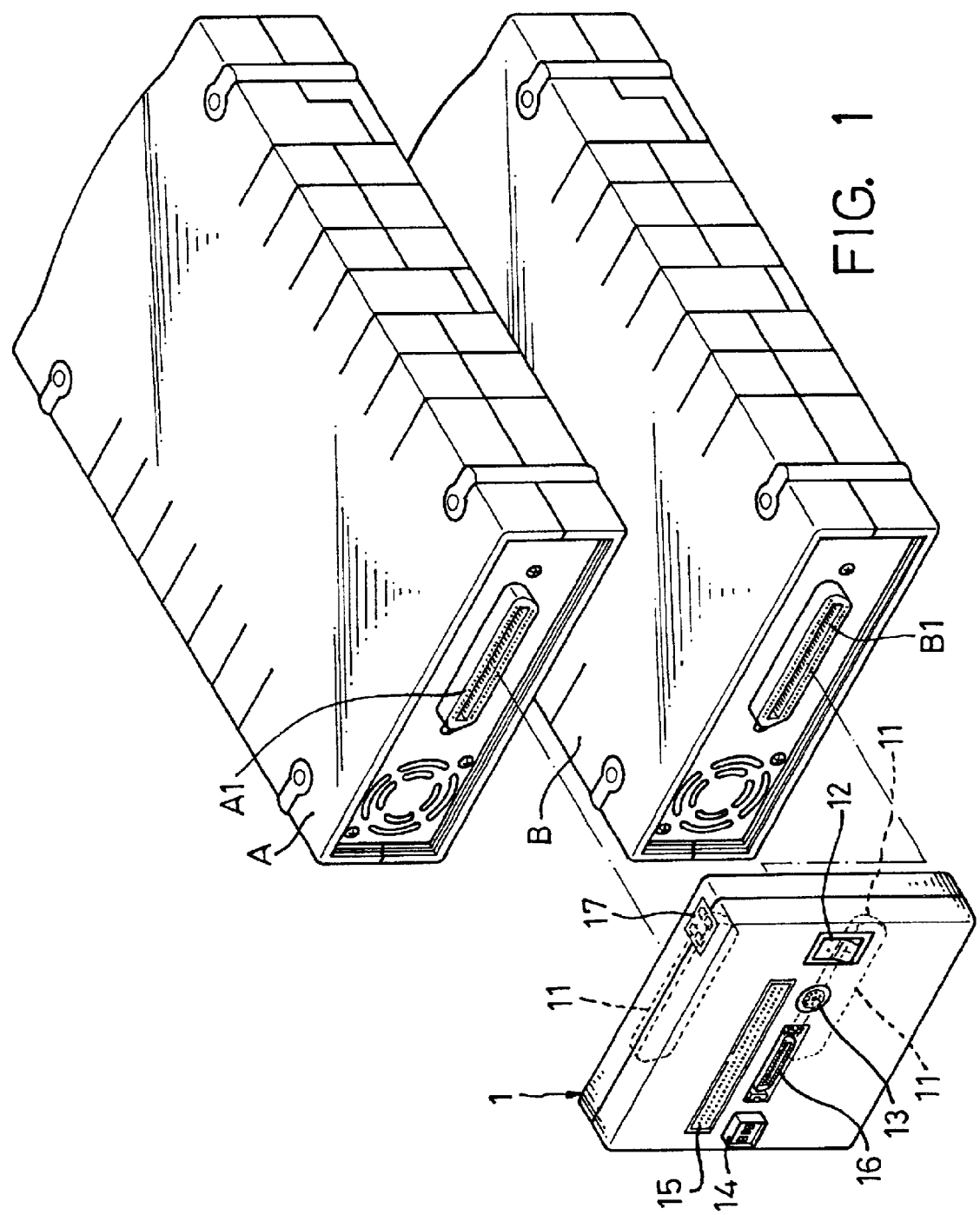
FIG. 1 is a perspective view of an external controller of burning record for compact disks according to the present invention with two docking boxes in a state of disengagement.
Figure 2:
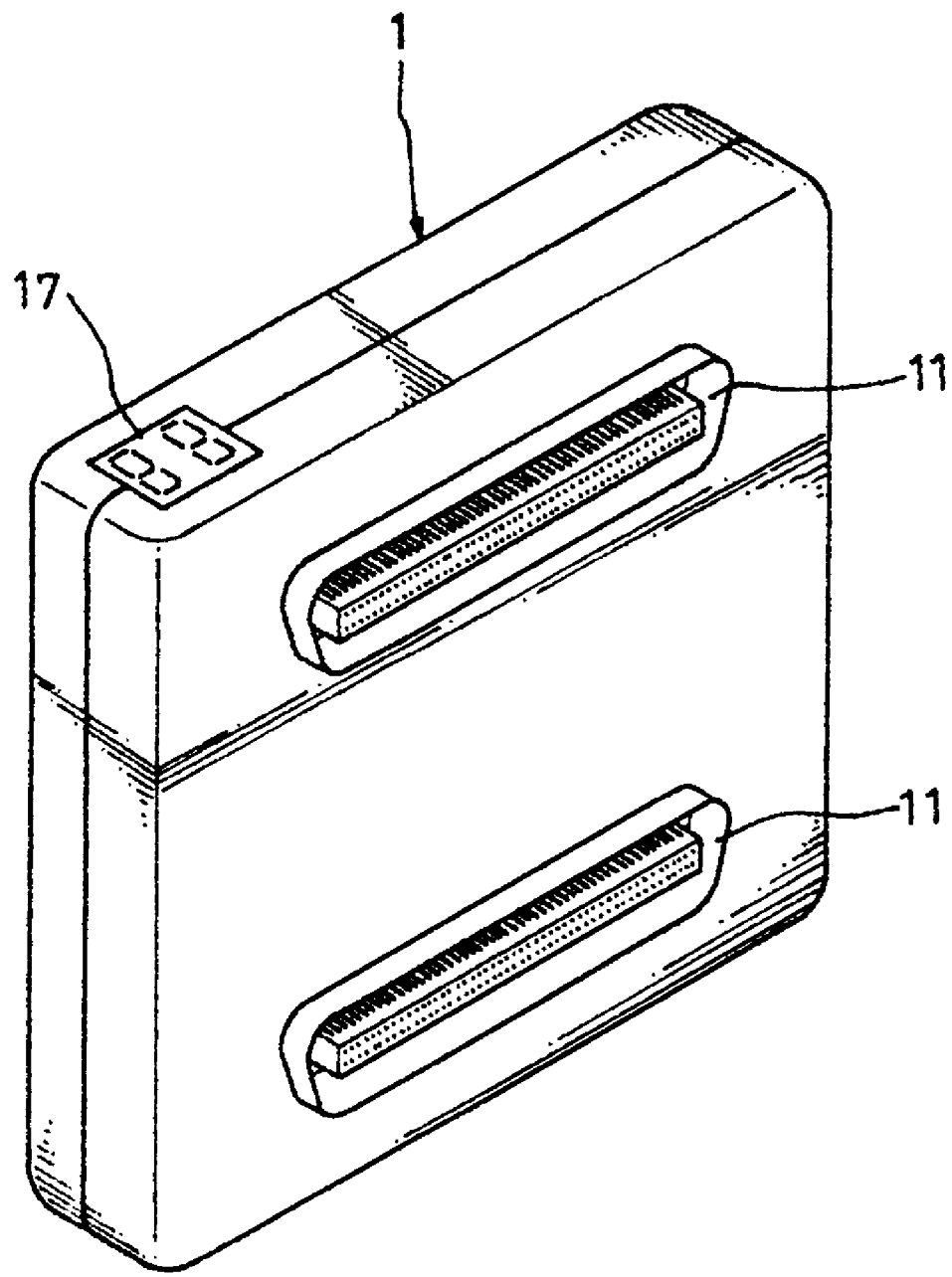
FIG. 2 is an another perspective view of the external controller of burning record according to the present invention showing the front side thereof.
Figure 3:
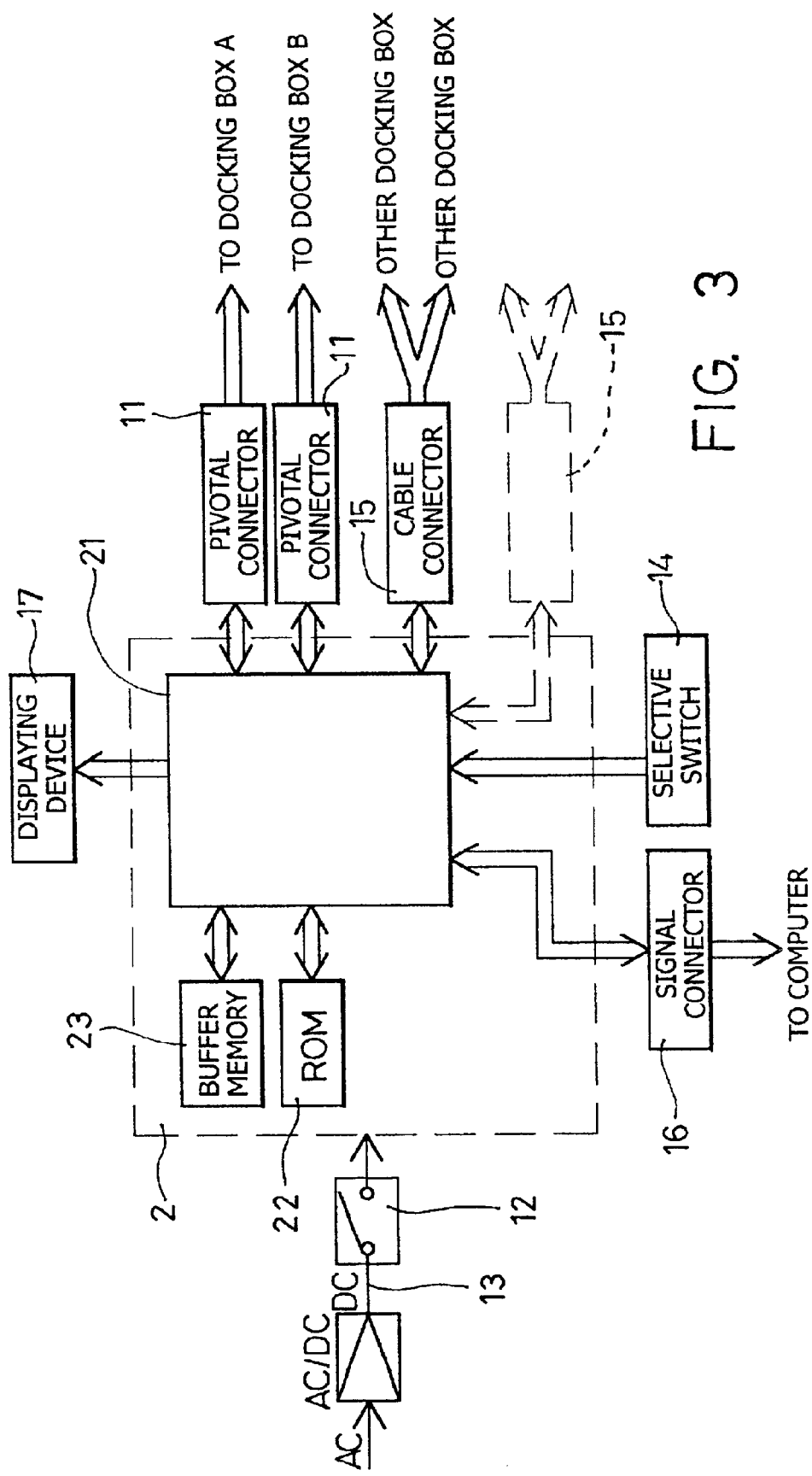
FIG. 3 is a diagram illustrating the layout of a circuit board in the external controller of burning record according to the present invention.

Referring to FIGS. 1 to 3, an external controller of burning record for compact disks according to the present invention comprises a control box 1, and a circuit board 2 received in the control box 1.

Wherein, the control box 1 basically is a case body and a front panel thereof has two pivotal connectors 11, 11 corresponding to two connectors A1, B1 on two docking boxes A, B respectively so as to connect with these two docking boxes A, B for signal connection. It is noted that the docking boxes shown in FIGS. 1 and 2 can be mobile racks. Thus, the docking box A can receive data record loading device such as read only compact disk drive (CD-ROM, DVD-ROM), hard disk (HHD) drive, ZIP disk drive, magneto-optical disk drive, LS-120 disk drive, magnetic tape drive, or card read. The docking box B can receive a compact disk burning record device (CD-R, CD-RW, or DVD-R). Besides, a control switch button 12 is provided on the rear side of respective docking boxing for executing power on or off and for burning on or shutting off the operation of recording. A power supply 13 is also provided to offer the circuit board 2 and pivot connectors 11 a stabilized voltage. The power supply 13 as shown in FIG. 1 is a socket for connecting the direct current (DC) with stabilized voltage from a transformer, but it is an example only not for a restriction. Alternatively, the direct current can be obtained by way of the power source of alternate current (AC) being rectified by the conventional transform circuit in the control box 1 before supplying to the circuit board 2.

Moreover, at least a selective switch 14 such as a finger pushed switch is provided at rear side of control box 1 to control options such as the speed of burning record, simulation of recording, recording directly, data comparison, or connecting with two or more docking boxes containing compact disk recording devices via one or more cable connectors 15 in series. Besides, each cable connector 15 at the rear side of control box is conventional with two joints for connecting with docking boxes containing two or more compact disk burning record devices so as to achieve a purpose of copying multiple compact disks. Also, a signal connector 16 may be provided at the rear side of control box such that the computer can read and/or write data from the docking boxes A, B by way of the conventional signal line connecting with the computer. A displaying device 17 such as a liquid crystal display (LCD) can be provided on the control box 1 such that the digits, ER, CH, CR, and VR represent the recording speed, the error, the simulation, the comparison, respectively. Of course, it is not required that the displaying device 17 has to be the liquid crystal display and the conventional light emitting diode (LED) can be utilized to signal the status of operation by way of flashes thereof.

Referring to FIG. 3 again, the circuit board 2 is received in the control box 1 and provides related circuits to connect with the preceding parts. A control chip 21 disposed on the circuit board 2 is provided with a burning firmware for offering the compact disk burning record device a recording program. Thus, the loader containing data records and the compact disk burning record device in docking boxes A, B respectively connect with each other via connectors 11. In this way, the operation of burning record can be performed by way of executing the built-in control program or the selective switch 14 for choosing a desired option. The status of burning is shown on the displaying device 17.

Referring to FIG. 3 further, the burning firmware may be provided with a read only memory (ROM) 22 on the circuit board to offer the compact disk burning record device a recording program. In practice, it is preferable that the ROM 22 is the flash memory such that the firmware can be updated through the INTERNET or other record loader (such as the floppy disk) as soon as the signal connector 16 connects with the computer. Furthermore, a buffer memory 23 can be provided on the circuit board to make up the insufficient buffer memory in the original compact disk burning record device while in use. In this way, the burning process can be accessed smoothly without failure. In practice, it is preferable that the buffer memory 23 is a flash memory too.

Figure 4:
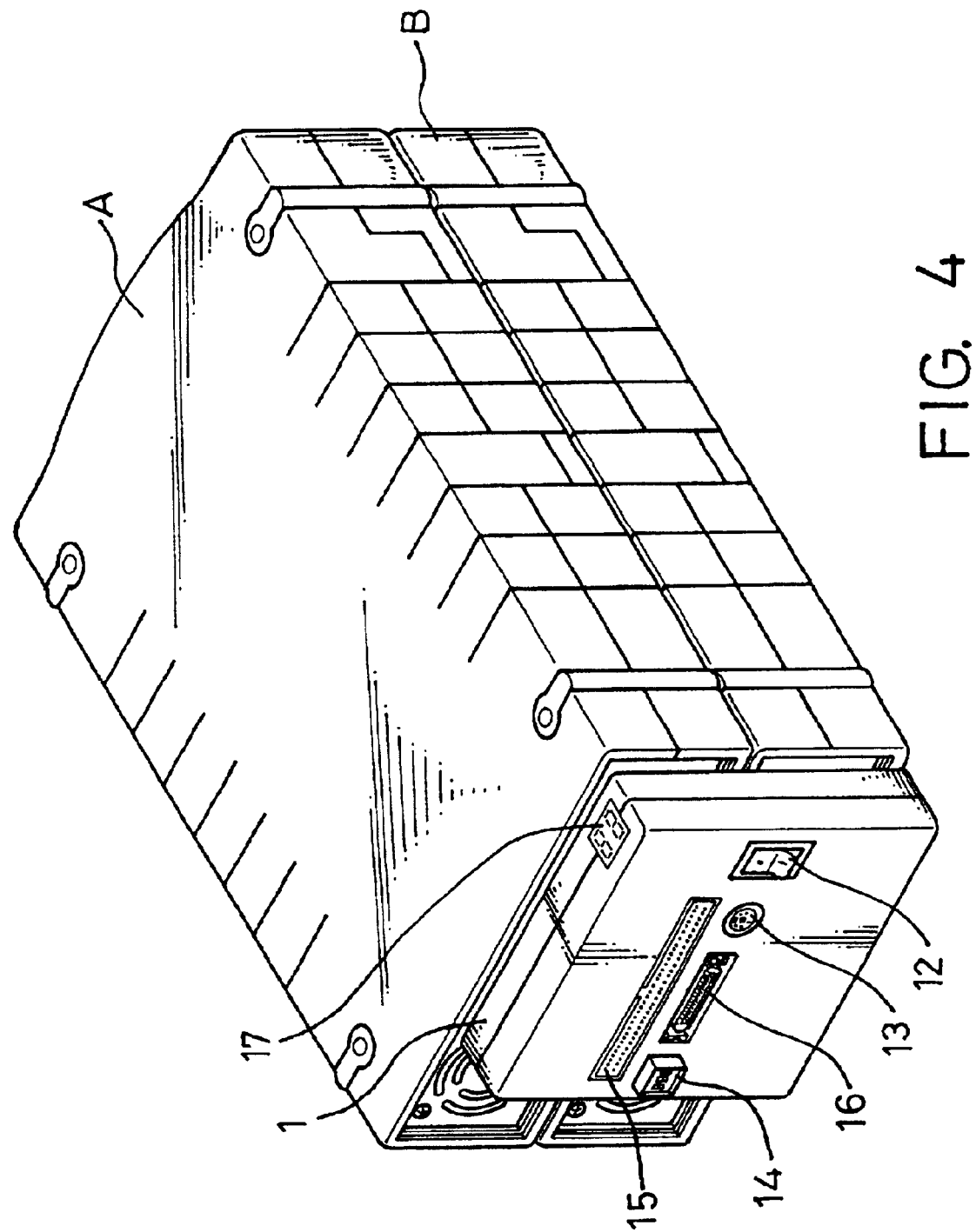
FIG. 4 a perspective view of an external controller of burning record according to the present invention with two docking boxes in a state of engagement.

Referring to FIG. 4, the operation of present invention will be described in detail hereinafter. When the user is going to carry out the operation of burning record device, the docking box A containing a data record loader and docking box B containing a compact disk burning record device are piled as an integral unit first. Then, these two pivotal connectors 11 at the front panel of control box 1 are jointed to connectors A1, B1 on the docking boxes respectively to constitute a close circuit. Next, the power source with stabilized voltage is connected to the power supply 13 and the control switch button 12 is pressed down to perform the operation of burning directly or the selective switch 14 is adjusted before the control switch button 12 is pressed. The adjustment of selective switch 14 can reset the options such as the speed of burning record, simulation before the actual burning, and data comparison after proceeding the recording. The displaying device 17 can show the burning process and the burned record. Hence, it is very much convenient for the user to operate the controller of present invention. As soon as the burning job is finished, the docking boxes A, B can be detached from each other and connect with individual computer respectively such that the availability of docking boxes can be enhanced without resulting in idling.

It can be understood from the preceding explanation of embodiment that the external controller for recording the compact disk according to the present invention can provide substantial advantages over the prior art. The external controller of burning record for compact disks disclosed in the present invention connects with a docking box containing a data record loader and another docking box containing a compact disk burning record device so as to provide a function of mutual copying for compact disks. Once the docking boxes are separated, the respective docking box can be connected to an computer as one of periphery thereof to provide an extending function by way of external connection. In this way, an idling data record device may be avoided completely. Hence, the present invention has provided not only the advantage of mutual copying of compact disks but also the advantage of the external connection type of compact disk burning record device. Besides, the data record loader adopted by the present invention is not limited to the read only compact disk so that the adaptability thereof can be expanded substantially. Furthermore, the present invention provides one or more cable connectors and it is possible for the present invention to connect multiple compact disks burning record device. Thus, a purpose of copying multiple compact disks can be achieved to reduce working hours of making test compact disks and mother compact disk. Moreover, the present invention may connect with the computer via a signal connector to read or write data directly such that the sophisticate procedure with regard to the job of installing software can be saved effectively.

While the invention has been described with reference to a preferred embodiment thereof, it is to be understood that modifications or variations may be easily made without departing from the spirit of this invention, which is defined by the appended claims.

What is claimed is:

1. An external controller of burning record for compact disks, comprising
   a control box with a front panel and a rear side, the front panel thereof extending two pivotal connectors to connect with two docking boxes containing a data record loader and a compact disk burning record device respectively, the rear side thereof providing a power supply to obtain the direct current with stabilized voltage and a control switch for powering on or off and for starting or shutting off the burning record operation;
   a circuit board, being disposed in the control box to receive the direct current with stabilized voltage, having related wires to connect with the preceding components, providing a control chip containing a recording firmware and offering the compact disk burning record device a burning record program to execute related steps of burning process;
   whereby, once the control switch button is pressed down to power on the power source, the operation of burning record can be processed smoothly.

2. The external controller for recording compact disks according to claim 1, wherein the respective docking box may be a mobile rack.

3. The external controller for recording compact disks according to claim 1, wherein the data record loader may be a read only compact disk drive (CD-ROM or DVD-ROM), a hard disk drive, a ZIP drive, a magneto-optical disk drive, a LS-120 floppy disk drive, magnetic tape driver, or card read.

4. The external controller for recording compact disks according to claim 1, wherein the compact disk burning record device is CD-R, CD-RW, or DVD-R.

5. The external controller for recording compact disks according to claim 1, wherein the control box at the rear side thereof provides at least a selective switch for executing options related to burning record and as a basis of burning record.

6. The external controller for recording compact disks according to claim 1, wherein the control box at the rear side thereof provides one or more cable connectors to connect with two or more compact disk burning record device by way of one or more cables.

7. The external controller for recording compact disks according to claim 1, wherein the control box at the rear side thereof provides a signal connector to connect with a computer via a signal line so as to perform data read and/or write between the computer and the read only compact disk and/or the compact disk burning record device.

8. The external controller for recording compact disks according to claim 1, wherein the control box may provide a displaying device to display the constant state of burning record.

9. The external controller for recording compact disks according to claim 8, wherein the displaying device is a liquid crystal display (LCD).

10. The external controller for recording compact disks according to claim 8, wherein the displaying device is a plurality of indicating lights.

11. The external controller for recording compact disks according to claim 1, wherein the power supply is a connecting socket for connecting the direct current with stabilized voltage.

12. The external controller for recording compact disks according to claim 1, wherein the power supply is a built-in rectifying transformer circuit disposed in the control box so as to rectify the alternate current (AC) and to drop the voltage thereof to form a direct current (DC).

13. The external controller for recording compact disks according to claim 1, wherein the burning firmware may be provided in a read only memory on the circuit board.

14. The external controller for recording compact disks according to claim 1, wherein a buffer memory can be provided on the circuit board to increase a storage apace for data from the read only compact disk.

15. The external controller for recording compact disks according to claim 13, wherein the read only memory and the buffer memory are flash memories.

16. The external controller for recording compact disks according to claim 14, wherein the read only memory and the buffer memory are flash memories.

* * * * *